(12) United States Patent
Gittins et al.

(10) Patent No.: US 10,704,677 B2
(45) Date of Patent: Jul. 7, 2020

(54) METHOD OF DISCHARGING TRANSMISSION ACCUMULATOR

(71) Applicant: Ford Global Technologies, LLC, Dearborn, MI (US)

(72) Inventors: Scott Joseph Gittins, Ann Arbor, MI (US); Lisa Waldock, Livonia, MI (US); Stephen Michael Cicala, Dearborn Heights, MI (US); Joseph Scott Slayton, Macomb Township, MI (US); Derek Kinch, Ypsilanti, MI (US); Timothy Fedullo, Northville, MI (US); Bradley D. Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 16/004,681

(22) Filed: Jun. 11, 2018

(65) Prior Publication Data
US 2019/0376597 A1   Dec. 12, 2019

(51) Int. Cl.
*F16H 61/00* (2006.01)
*F16H 63/34* (2006.01)
*F16H 59/68* (2006.01)

(52) U.S. Cl.
CPC ..... *F16H 61/0025* (2013.01); *F16H 63/3483* (2013.01); *F16H 2059/683* (2013.01); *F16H 2061/0034* (2013.01)

(58) Field of Classification Search
CPC ............. F16H 61/0021; F16H 61/0025; F16H 2061/0034; F16H 59/44; F16H 2059/446; F16H 2059/683; F16H 63/3483; F16D 2048/0293; F16D 48/066; F16D 48/10; F15B 1/033; F15B 2211/212; F15B 2211/6309; F15B 2211/30505; F15B 2211/40584

See application file for complete search history.

(56) References Cited

U.S. PATENT DOCUMENTS

| 5,743,366 | A | 4/1998 | Stoever et al. |
| 9,540,013 | B2 | 1/2017 | Morino et al. |
| 2013/0232962 | A1 | 9/2013 | Marin et al. |
| 2017/0284424 | A1 | 10/2017 | Kawaura et al. |
| 2019/0092334 | A1* | 3/2019 | Demain ............. B60W 30/192 |

FOREIGN PATENT DOCUMENTS

WO    2015175262 A1   11/2015

* cited by examiner

*Primary Examiner* — Jacob S. Scott
*Assistant Examiner* — Lori Wu
(74) *Attorney, Agent, or Firm* — Vincent Mastrogiacomo; Brooks Kushman PC

(57) ABSTRACT

A transmission includes an accumulator to hold one of more shift elements in an engaged state while an engine is off. The transmission also includes a hydraulic park system that disengages park in response to engagement of two shift elements. In some circumstance, draining the accumulator in an uncontrolled manner in the presence of a failed valve may lead to unintentionally disengaging park. To avoid this, the accumulator is discharged in a controlled manner. Fluid is first transferred from the accumulator to a shift element apply chamber. Then, the fluid is vented from the shift element apply chamber.

8 Claims, 7 Drawing Sheets

METHOD OF DISCHARGING TRANSMISSION ACCUMULATOR

TECHNICAL FIELD

This disclosure relates to the field of hydraulic control systems for automatic transmissions for motor vehicles. More particularly, the disclosure relates to a method of safely discharging a hydraulic accumulator without inadvertently disengaging a park mechanism.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

When a vehicle is parked, the transmission may engage a parking pawl which holds the transmission shaft stationary to prevent the vehicle from rolling. The parking system is designed to remain engaged without consuming any power during extended unattended periods. Normally, the parking pawl is engaged in response to the driver selecting Park and is disengaged in response to the driver selecting any other range, such as Reverse, Neutral, Drive, or Low. However, there are some conditions in which the transmission may over-ride the driver selection.

To save fuel, some vehicles are programmed to automatically shut off the engine when the vehicle is stopped while in Drive, such as while waiting at a red traffic light. The engine is then automatically started when the driver lifts his or her foot off the brake pedal. It is important that the vehicle begin accelerating as soon as the driver presses the accelerator pedal. To accomplish that, it may be necessary to keep one or more shift elements engaged. Since the engine driven pump does not provide pressurized fluid when the engine is off, a different source of pressurized fluid may be included, such as an electrically driven pump or a hydraulic accumulator.

SUMMARY OF THE DISCLOSURE

A transmission includes an accumulator valve, a first shift valve, and a controller. The accumulator valve is configured to selectively fluidly connect an accumulator to a line pressure circuit. The first shift valve is configured to alternately fluidly connect a first apply chamber to the line pressure circuit and to a vent. The controller is programmed to respond to a request to drain the accumulator by issuing a sequence of valve commands. The sequence includes commanding the first shift valve to fluidly connect the first apply chamber to the line pressure circuit, commanding the accumulator valve to fluidly connect the accumulator to the line pressure circuit to partially fill the first apply chamber, and commanding the first shift valve to fluidly connect the first apply chamber to the vent. The controller may be further programmed to measure a pressure of the first clutch apply chamber, and repeat the sequence of valve commands until the pressure no longer increases. The transmission may also include a second shift valve configured to alternately fluidly connect a second apply chamber to the line pressure circuit and to the vent, and a park valve configured to disengage a park mechanism in response to an increase in a pressure in the second apply chamber. The controller may be further programmed to, in response to the park valve not moving, command the accumulator valve to fluidly connect the accumulator to the line pressure circuit until the accumulator is discharged, without manipulating either shift valve. The transmission may also include a pump configured to supply pressurized fluid to a pump out circuit, wherein pressure in the pump out circuit biases the park valve against disengaging the park mechanism.

A transmission includes an accumulator, a first shift element apply circuit, and a controller. The accumulator is selectively fluidly connected to a line pressure circuit. The first shift element apply circuit is alternately fluidly connected to the line pressure circuit and to a vent. The controller is programmed to drain fluid from the accumulator by repeatedly partially filling a first apply chamber via the first shift element apply circuit and then venting the first apply chamber until no increase in clutch pressure is detected. The controller may also be programmed to, in response to an accumulator discharge request, partially drain the accumulator with the first apply circuit fluidly disconnected from the line pressure circuit, and, in response to a park valve not moving, completely drain the accumulator with the first apply circuit fluidly disconnected from the line pressure circuit. The transmission may also include a second shift element apply circuit alternately fluidly connected to the line pressure circuit and to the vent, and a park valve configured to disengage a park mechanism in response to an increase in a pressure in the second apply circuit.

A method of draining fluid from a transmission accumulator includes repeating a series of steps until no increase in clutch pressure is detected. The sequence of steps includes operating a shift valve to fluidly connect a shift element apply chamber to a line pressure circuit, opening an accumulator control valve to fluidly connect the accumulator to the line pressure circuit to partially fill the apply chamber, and operating the shift valve to vent fluid from the partially filled apply chamber. The method may also include, in response to an accumulator discharge request, opening the accumulator valve with the apply chamber fluidly disconnected from the line pressure circuit, and, in response to a park valve not moving, leaving the accumulator valve open with the apply chamber fluidly disconnected from the line pressure circuit until the accumulator is completely drained.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
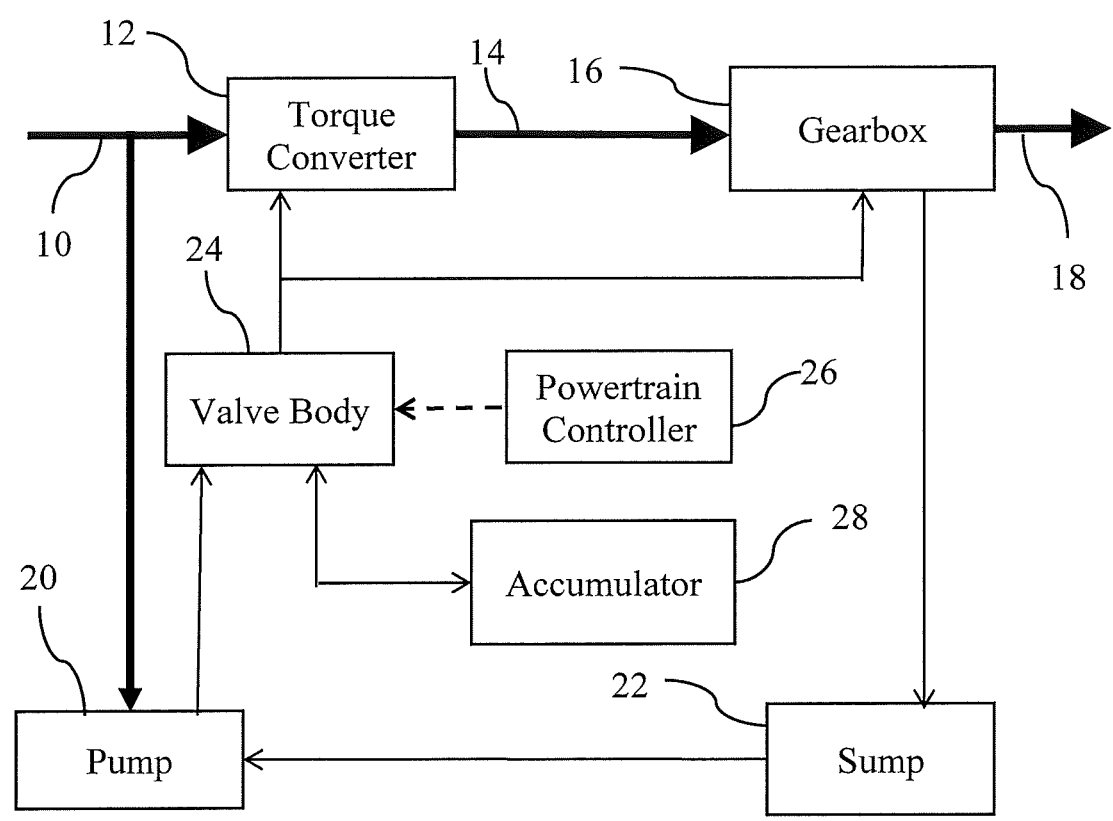
FIG. 1 is a schematic diagram of a transmission system.

FIG. 1 schematically illustrates a vehicle transmission. Bold solid lines represent mechanical power flow connections. Thin solid lines represent the flow of hydraulic fluid. Dashed lines represent the flow of information signals. Power is supplied at input shaft 10, generally from an internal combustion engine crankshaft. Fluid coupling 12 includes an impeller driveably connected to input shaft 10 and a turbine driveably connected to turbine shaft 14. Power is transmitted from the impeller to the turbine via moving fluid whenever the impeller rotates faster than the turbine. Fluid coupling 12 may be a torque converter which also includes a stator which redirects the fluid when the impeller is rotating substantially faster than the impeller such that the turbine torque is a multiple of the impeller torque. Gearbox 16 includes gearing and shift elements configured to establish various power flow paths between turbine shaft 14 and output shaft 18. Each power flow path may be established by engaging a specified subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

Most of the shift elements within gearbox 16 are engaged by supplying hydraulic fluid at an elevated pressure to a clutch apply chamber. (Gearbox 16 may also include passively engaged one-way clutches or electrically actuated elements.) Each shift element may include a clutch pack having friction plates splined to one component interleaved with separator plates splined to a different component. The pressurized fluid forces a piston to squeeze the clutch pack such that frictional force between the friction plates and the separator plates couples the components. The torque capacity of each shift element varies in proportion to changes in the fluid pressure. Pump 20, driven by input shaft 10, draws fluid from sump 22 and delivers it at an elevated pressure to valve body 24. Valve body 24 delivers the fluid to the clutch apply chambers at a pressure controlled in accordance with signals from powertrain controller 26. In addition to the fluid provided to clutch apply chambers, valve body provides fluid for lubrication and provides fluid to torque converter 12. The fluid eventually drains from gearbox 18 back to sump 22 at ambient pressure.

To reduce energy consumption, the internal combustion engine may be shut off when the vehicle is stopped, such as when waiting at a stop light. The engine is then restarted when the driver releases the brake pedal. To ensure that the powertrain is ready to transmit power as soon as the engine is started, it is desirable to maintain some shift elements in an engaged state while the engine is off. To accomplish that, pressurized fluid is allowed to flow into accumulator 28 when the engine is running and then returned to the valve body 24 when the engine is off.

Figure 2:
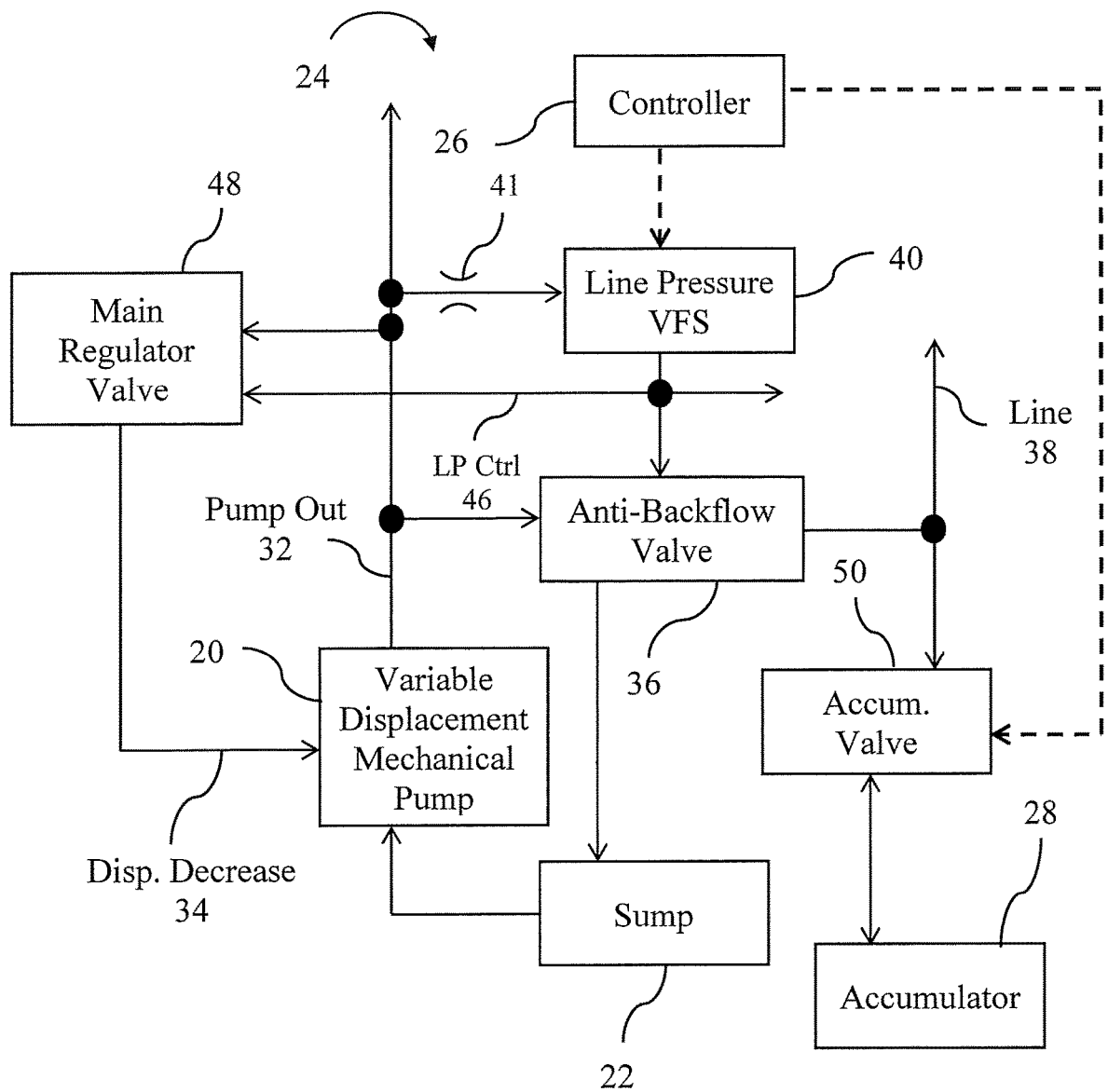
FIG. 2 is a schematic diagram of a fluid supply subsystem of a hydraulic control system for the transmission of FIG. 1.

FIG. 2 schematically illustrates a portion of valve body 24 that constitutes a fluid supply subsystem. A similar fluid supply subsystem is discussed in U.S. Patent Application Publications 2013/0014498 and 2013/0017112 which are incorporated by reference in their entirety herein. Pump 20, which is driven by the transmission input shaft, draws fluid from sump 22 and delivers the fluid to pump out circuit 32. Pump 20 is a positive displacement pump. Disregarding leakage, positive displacement pumps deliver a certain amount of fluid per revolution of the pump shaft regardless of the relative pressure at the pump inlet and pump outlet. The amount of fluid delivered per revolution is called the pump displacement. The displacement of pump 20 varies within predefined limits based on the pressure in displacement decrease circuit 34. The torque required to rotate the pump shaft increases as the pressure at the pump outlet increases relative to the pressure at the inlet and also increases in proportion to the pump displacement.

During normal operation, anti-backflow valve 36 is open such that fluid flows freely from the pump out circuit 32 to the line pressure circuit 38 and the pressure in the two circuits is substantially equal. The controller 26 adjust the pressure in these two circuits by sending a command to line pressure Variable Force Solenoid (VFS) 40. Fluid flows from the pump out circuit 32, through an orifice 41, through a valve opening in line pressure VFS 40 and then into Line Pressure Control Circuit (LP Ctrl Circuit) 46. The pressure drop from the pump output circuit 32 to the LP Ctrl circuit 46 varies depending upon the size of the opening in line pressure VFS 40. The size of the opening in line pressure VFS 40 varies based on movement of a spool. Electrical current from controller 26 creates a magnetic force on the spool tending to enlarge the opening. Fluid in the LP Ctrl circuit 46 acts on an area of the spool to create a force tending to reduce the size of the opening. An equilibrium is reached at which the pressure in the LP Ctrl circuit 46 is proportional to the electrical current.

Main regulator valve 48 adjusts the displacement of pump 20 in order to maintain the pressure in pump out circuit 32 proportional to the pressure in the LP Ctrl circuit 46. Pressure in the LP Ctrl circuit 46 generates a force on a spool in main regulator valve 48. Pressure in the pump out circuit 32 generates a force on the spool valve in the opposite direction. When the pressure in the pump out circuit 32 exceeds the pressure in the LP Ctrl circuit 46, the spool moves to allow flow from pump out circuit 32 to displacement decrease circuit 34. Pressure in circuit 34 causes a reduction in the flow rate from pump 20 into the pump out circuit 32. Components fed by the pump out circuit 32 and the line pressure circuit 38 establish a relationship between the pressure in these circuits and the flow rate. Consequently, the reduction in flow rate results in a reduction in the pressure in pump out circuit 32 until an equilibrium is reached.

When the vehicle is stopped, such as when waiting at a traffic light, powertrain controller 26 may shut off the engine to conserve fuel. When the driver again demands torque by releasing the brake and depressing the accelerator pedal, the controller restarts the engine. In order to respond quickly after the engine is restarted, it is important to maintain some clutches in an engaged state. Fluid flow to maintain these clutches is provided by accumulator 28 which feeds line pressure circuit 38 via accumulator control valve 50. When the engine is running and the pressure in the line pressure circuit exceeds the pressure in the accumulator, controller 26 opens valve 50 to charge the accumulator. In some embodiments, charging of the accumulator may be accomplished passively by a check valve in parallel with valve 50. During engine shutdown periods, controller 26 pressurizes line pressure circuit 38 by opening valve 50. During these engine shutdown periods, controller 26 also sets the current to line pressure VFS 40 to an intermediate level causing the pressure in LP Ctrl circuit 46 to be at an intermediate level. In response to this reduction in LP Ctrl pressure, the spool of anti-backflow valve 36 moves to a position in which the line pressure circuit is isolated from the pump out circuit 32, reducing the number of components that must be fed by the accumulator. In circumstances that will be described below, controller 26 may set the current to line pressure VFS 40 to a low level which moves the spool of the anti-backflow valve 36 to a position in which the line pressure circuit 38 is isolated from the pump out circuit 32 and fluidly connected to a vent circuit. In this condition, the pressure in line pressure circuit 38 drops rapidly to ambient pressure.

Figure 3:
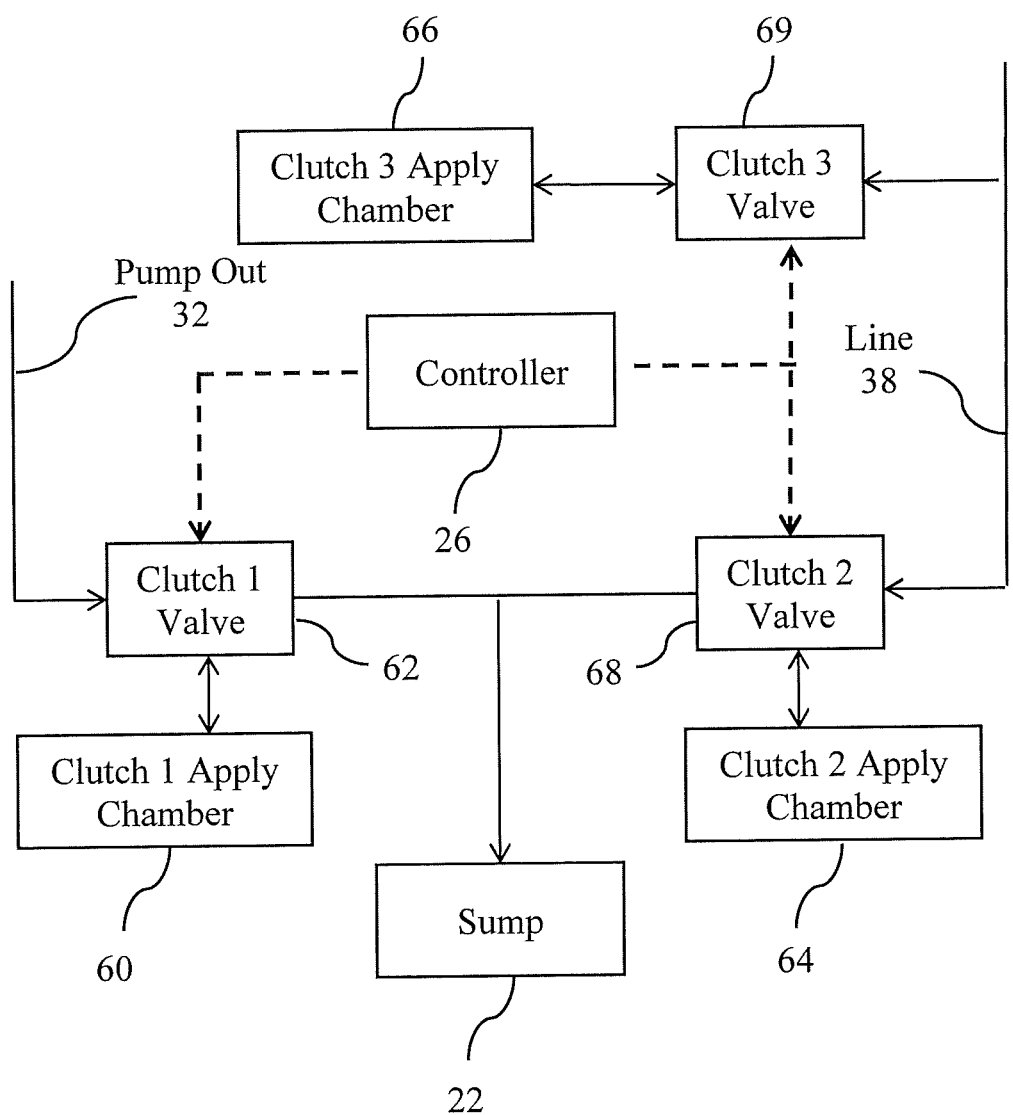
FIG. 3 is a schematic diagram of a portion of the shift element control subsystem of a hydraulic control system for the transmission of FIG. 1.

FIG. 3 schematically illustrates a portion of a clutch control subsystem. The clutch apply chamber of a first shift element 60 is supplied from the pump out circuit 32 via a VFS valve 62. As a result, shift element 60 can only be applied when the engine is running. To engage the shift element, the controller commands valve 62 to set the pressure of the clutch apply chamber to a value between zero and the pressure in pump out circuit 32. The controller adjusts the pressure by adjusting a current to a solenoid in valve 62. When the current is set to zero, valve 62 isolates the clutch apply chamber from pump out circuit 32 and connects clutch apply chamber 60 to sump 22 thereby allowing the fluid to escape to release the clutch. Although a single valve is shown for simplicity, the system may include a latch valve or other supplemental valves. Similarly, the clutch apply chambers of a second and third shift elements 64 and 66 are supplied from the line pressure circuit 38 via a VFS valves 68 and 69 respectively. As a result, shift elements 64 and 66 can be applied even when the engine is not running. To engage clutch 2, the controller commands valve 68 to set the pressure of the clutch apply chamber 64 to a value between zero and the pressure in line pressure circuit 38. The controller adjusts the pressure by adjusting a current to a solenoid in valve 68. When the current is set to zero, valve 68 isolates the clutch apply chamber from pump out circuit 32 and connects clutch apply chamber 64 to sump 22 thereby allowing the fluid to escape to release the clutch. Additional shift elements are controlled similarly, some supplied by the line pressure circuit 38 and some supplied by the pump out circuit 32.

Figure 4:
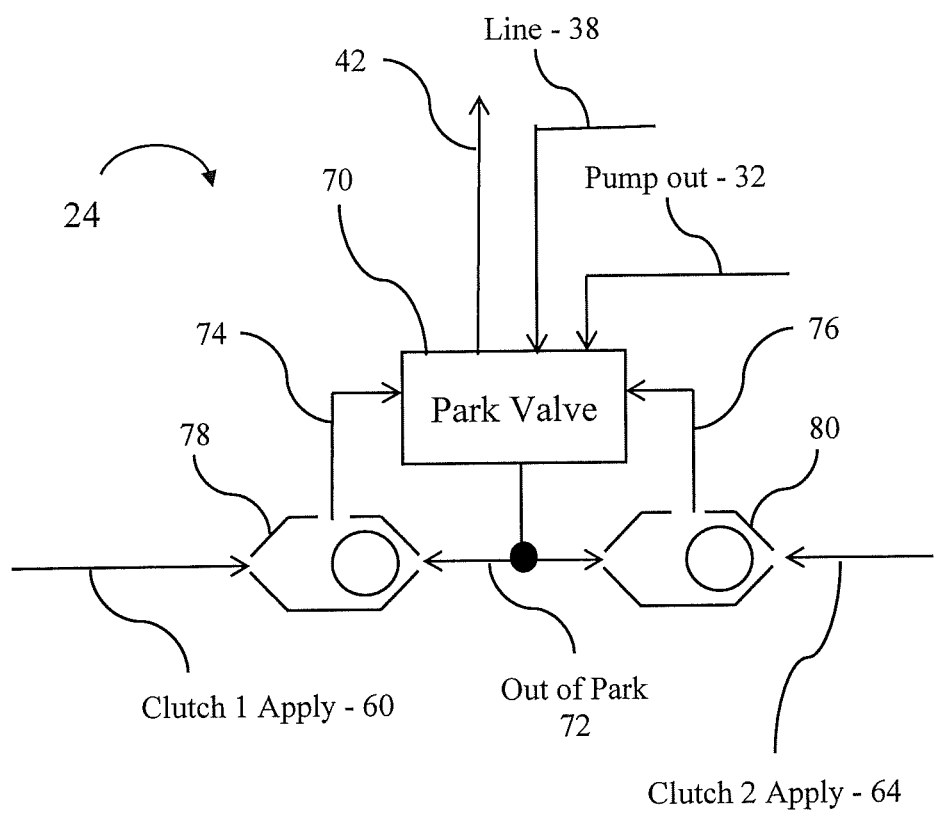
FIG. 4 is a schematic diagram of a park subsystem of a hydraulic control system for the transmission of FIG. 1.

FIG. 4 schematically illustrates the park control subsystem of valve body 24. A spool of park valve 70 is mechanically linked to the park mechanism, such that movement of the spool in one direction engages the park mechanism and movement in the opposite direction disengages the park mechanism. The structure of park valve 70 is described in more detail below. A spring within the park mechanism biases the system toward engagement. Also, pressure in the pump out circuit 32 acts on an area of the spool to bias the system toward park engagement. Park valve 70 fluidly connects an out-of-park circuit 72 to the line pressure circuit 38 when park is disengaged and vents out-of-park circuit 72 when park is engaged. Hydraulic circuits 72 and 76 bias the park valve toward the disengaged position. Check valve 78 fluidly connects circuit 74 to either clutch 1 apply circuit 60 or out-of-park circuit 72, whichever has the higher pressure. Similarly, check valve 80 fluidly connects circuit 76 to either clutch 2 apply circuit 64 or out-of-park circuit 72, whichever has the higher pressure.

When the park mechanism is engaged, both the park mechanism itself and pressure in pump out circuit 32 tend to hold park valve 70 in the engaged position. To disengage the park mechanism, clutches 1 and 2 are engaged by commanding full pressure to apply circuits 60 and 64. Check valves 78 and 80 fluidly connect these clutch apply circuits to circuits 74 and 76 respectively. Pressure in circuits 74 and 76 force the park valve into the disengaged position. Once in the disengaged position, park valve 70 fluidly connects out-of-park circuit 72 to line pressure circuit 38. As a result, the park valve stays in the disengaged position even if clutches 1 and 2 are later released. To re-engage the park mechanism, the pressure in pump out circuit 32 is reduced to a level at which the park mechanism spring forces the park valve to the engaged position. For faster engagement of park, the line pressure may be vented via anti-backflow valve 36 as described above. With the engine running, pump out circuit 32 will have pressure forcing the spool toward the engaged position.

Figure 5:
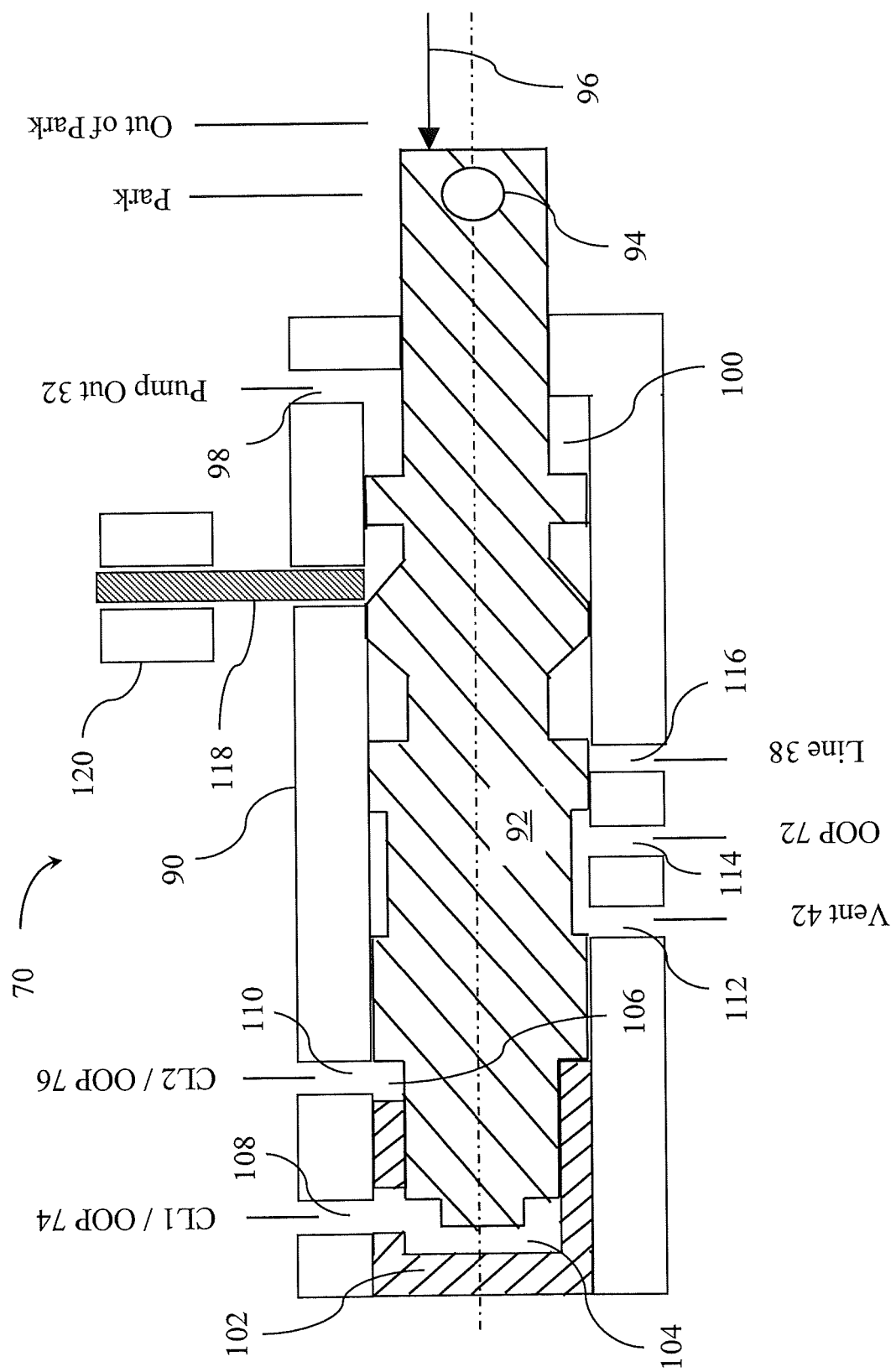
FIG. 5 is a cross section of a park valve assembly of the park subsystem of FIG. 4 in a position corresponding to park engaged.

FIG. 5 shows a cross section of park valve 70 in the position corresponding to Park. The valve includes a housing 90 with a bore and several ports. Spool 92 slides within the bore. Spool 92 is mechanically linked to the park mechanism via a feature such as hole 94. The park mechanism includes a spring that applies a return force 96 on spool 92 tending to push it to the left (pawl engaged position). Pump out circuit 32 is connected to port 98 to provide fluid to chamber 100. Pressure in chamber 100 biases spool 92 toward the left, tending to hold the park mechanism in the engaged position.

End cap 102 is fixed to housing 90. End cap 102, housing 90, and spool 92 cooperate to define chambers 104 and 106. Circuits 74 and 76 are connected to ports 108 and 110 respectively to provide fluid to chambers 104 and 106 respectively. Fluid pressure in these chambers act on separate areas of spool 92, biasing spool 92 toward the right. Ports 112, 114, and 116 are connected to vent 42, out-of-park circuit 72, and line pressure circuit 38 respectively. When spool 92 is in the position shown in FIG. 5, it fluidly connects ports 112 and 114 such that the pressure in out-of-park circuit 72 is approximately equal to ambient pressure.

Holding pin 118 is shown in a retracted position in which it does not engage spool 92. Pin 118 may be biased toward this position by a spring or other force. When current is supplied to solenoid 120, it applies a magnetic force to pin 118 pushing it into engagement with spool 92.

Figure 6:
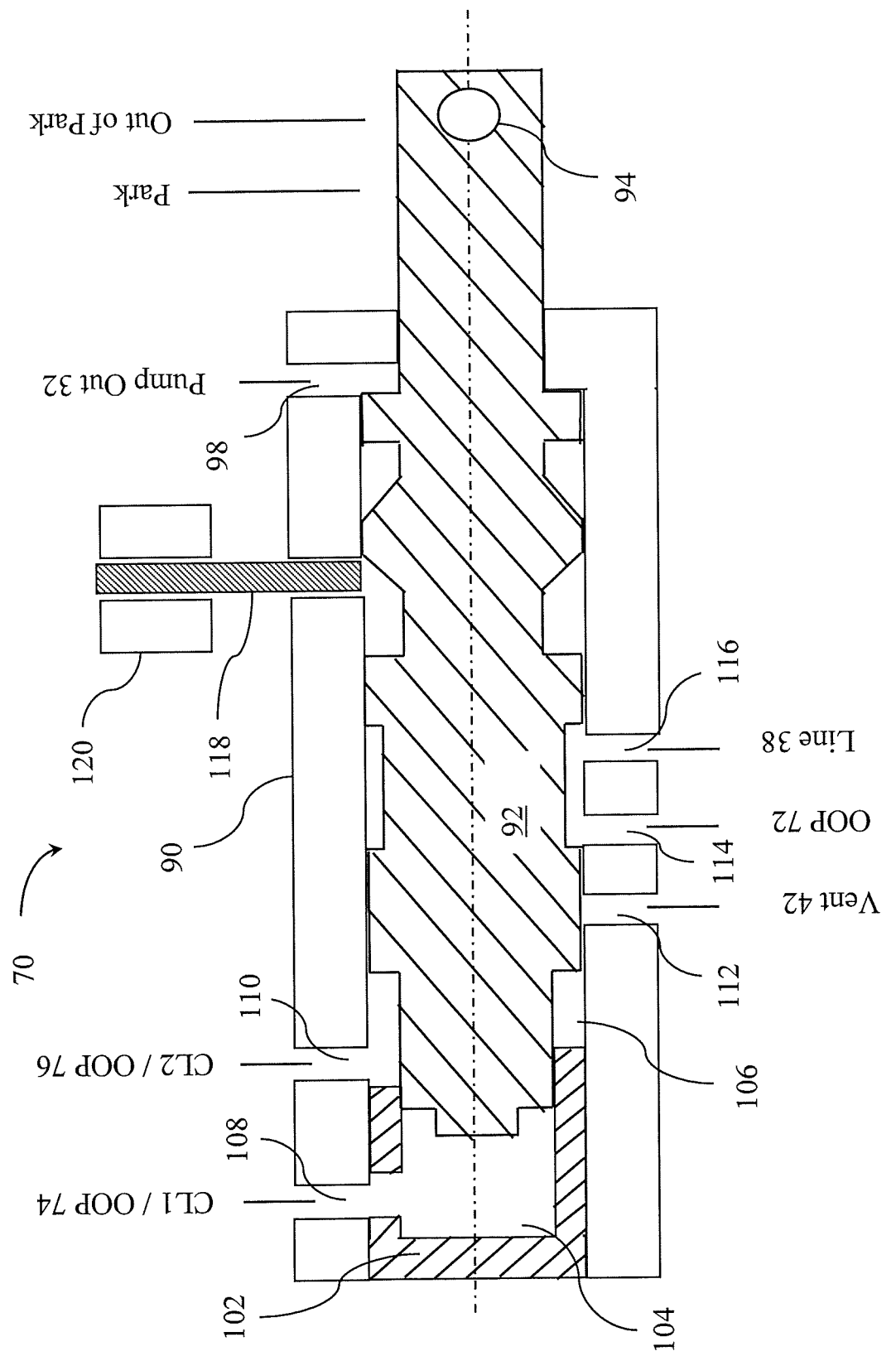
FIG. 6 is a cross section of a park valve assembly of the park subsystem of FIG. 4 in a position corresponding to park dis-engaged.

FIG. 6 shows a cross section of park valve 70 in the position corresponding to Drive, Reverse, or Neutral. The valve is moved from the position of FIG. 5 to the position of FIG. 6 by engaging clutches 1 and 2. The clutch apply pressure of these shift elements act on a larger area on the left side of spool 92 than what pump out pressure acts on the right side of spool 92, causing a net rightward force. When the line pressure is sufficiently high, this net force overcomes the force of the park mechanism return spring, pushing spool 92 to the position shown in FIG. 6 and disengaging the parking pawl.

With spool 92 in this position, port 114 is fluidly connected to port 116 such that line pressure circuit 38 is fluidly connected to out-of-park circuit 72. Due to the behavior of check valves 78 and 80, line pressure will continue to be supplied to ports 108 and 110 even if clutches 1 and 2 are later released.

To re-engage park, the line pressure circuit is vented via the anti-drainback valve, then pressure in pump out circuit 32 acts to move the spool toward the left.

When the vehicle is parked, it is advantageous to discharge the accumulator to relieve pressure on system components. This is particularly important if maintenance is to be performed. However, there is a risk that uncontrolled discharge of the accumulator in the presence of a failure of clutch 2 valve 68 could result in unintentional release of the park mechanism. Normally, two shift elements must be engaged to disengage the park mechanism. However, when the engine is off, pump out circuit 32 is not pressurized, so park could be disengaged by pressurizing circuit 64. During an uncontrolled discharge of the accumulator, line pressure circuit 38 is pressurized. If valve 68 is failed in an engaged state, clutch apply chamber 64 may also be pressurized.

Figure 7:
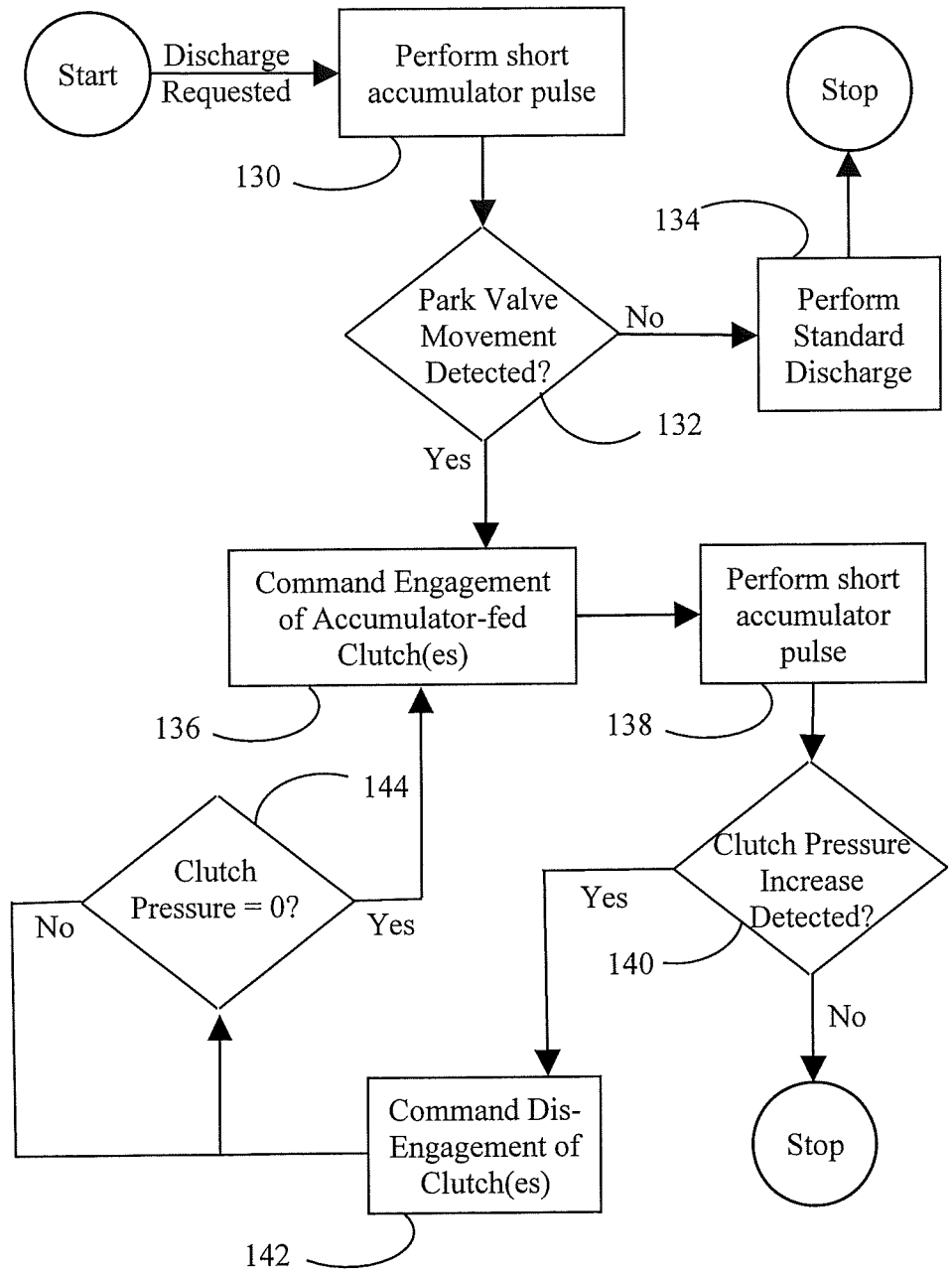
FIG. 7 is a flow chart for a method of discharging the accumulator of FIG. 1 via the shift control subsystem of FIG. 3 without risk of accidentally disengaging the park system of FIGS. 4-6.

FIG. 7 illustrates a method of controlling the release of pressure from the accumulator. This method is performed in response to a request to discharge the accumulator. Such as request may occur, for example, whenever the ignition is turned off by the driver with the transmission in Park. At 130, the controller commands valve 50 to "pulse" or momentarily open to release some fluid from the accumulator. The duration of the pulse is calculated such that the quantity of fluid would be insufficient to disengage the park mechanism if valve 68 is failed on but would be sufficient to cause some movement of spool 92 if valve 68 is failed on. At 132, the controller monitors the position of spool 92. If no movement is detected, the controller opens valve 50 and leaves it open until the accumulator is completely drained via leakage in line pressure circuit 38.

If movement of spool 92 is detected at 132, the controller proceeds with a controlled release of the fluid. At 136, the controller commands engagement of at least one accumulator fed clutch by manipulating valve 69 to fluidly connect line pressure circuit 38 to clutch apply chamber 66. At 138, the controller commands valve 50 to perform another short release of fluid from the accumulator. The duration of the release at 138 is not necessarily the same as the duration of the release at 130. Fluid flows from the accumulator into the clutch apply chamber 66, stroking the piston of the corresponding shift element. During the fluid release, at 140, the controller monitors a pressure sensor for clutch apply circuit 66. If the pressure does not increase, then the controller infers that the accumulator must be empty, so the process ends. Otherwise, at 142 the controller commands disengagement of the shift element by manipulating valve 69 to vent clutch apply chamber 66. As a result, the return spring of the clutch pushes the fluid from the clutch apply chamber to the sump. At 144, the controller monitors the pressure in the clutch apply chamber until it reaches ambient pressure indicating that the fluid has been drained. Then, the process repeats until the accumulator is empty as indicated at 140.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   an accumulator valve configured to selectively fluidly connect an accumulator to a line pressure circuit;
   a first shift valve configured to alternately fluidly connect a first apply chamber to the line pressure circuit and to a vent; and
   a controller programmed to,
      in response to a request to drain the accumulator, issue a sequence of valve commands including
         commanding the first shift valve to fluidly connect the first apply chamber to the line pressure circuit,
         commanding the accumulator valve to fluidly connect the accumulator to the line pressure circuit to partially fill the first apply chamber, and
         commanding the first shift valve to fluidly connect the first apply chamber to the vent,
      measure a pressure of a first clutch apply chamber, and
      repeat the sequence of valve commands until the pressure no longer increases.

2. The transmission of claim 1 further comprising:
   a second shift valve configured to alternately fluidly connect a second apply chamber to the line pressure circuit and to the vent; and
   a park valve configured to disengage a park mechanism in response to an increase in a pressure in the second apply chamber.

3. The transmission of claim 2 wherein the controller is further programmed to, in response to the park valve not moving, command the accumulator valve to fluidly connect the accumulator to the line pressure circuit until the accumulator is discharged, without manipulating either shift valve, and in response to the park value moving, issue the sequence of valve commands.

4. The transmission of claim 2 further comprising:
a pump configured to supply pressurized fluid to a pump out circuit, wherein pressure in the pump out circuit biases the park valve against disengaging the park mechanism.

5. A transmission comprising:
an accumulator selectively fluidly connected to a line pressure circuit;
a first shift element apply circuit alternately fluidly connected to the line pressure circuit and to a vent;
a controller programmed to
    drain fluid from the accumulator by repeatedly partially filling a first apply chamber via the first shift element apply circuit and then venting the first apply chamber until no increase in clutch pressure is detected,
    in response to an accumulator discharge request, partially drain the circuit, and
    in response to a park valve not moving, completely drain the accumulator with the first apply circuit fluidly disconnected from the line pressure circuit.

6. The transmission of claim 5 further comprising:
a second shift element apply circuit alternately fluidly connected to the line pressure circuit and to the vent; and
a park valve configured to disengage a park mechanism in response to an increase in a pressure in the second apply circuit.

7. The transmission of claim 6 further comprising:
a pump configured to supply pressurized fluid to a pump out circuit, wherein pressure in the pump out circuit biases the park valve against disengaging the park mechanism.

8. A method of draining fluid from a transmission accumulator comprising:
repeatedly
    operating a shift valve to fluidly connect a shift element apply chamber to a line pressure circuit;
    opening an accumulator control valve to fluidly connect the transmission accumulator to the line pressure circuit to partially fill the apply chamber; and
    operating the shift valve to vent fluid from the partially filled apply chamber
until no increase in clutch pressure is detected;
in response to an accumulator discharge request, opening the accumulator control valve with the shift element apply chamber fluidly disconnected from the line pressure circuits; and
in response to a park valve not moving, leaving the accumulator control valve open with the shift element apply chamber fluidly disconnected from the line pressure circuit until the transmission accumulator is completely drained.

* * * * *